(12) United States Patent
Mizutani et al.

(10) Patent No.: US 7,261,976 B2
(45) Date of Patent: Aug. 28, 2007

(54) NON-AQUEOUS ELECTROLYTE BATTERY AND METHOD OF MANUFACTURING THE SAME

(75) Inventors: Satoshi Mizutani, Tokyo (JP); Hiroshi Inoue, Fukushima (JP); Takatomo Nishino, Fukushima (JP); Atsuo Omaru, Fukushima (JP)

(73) Assignee: Sony Corporation, Tokyo (JP)

( * ) Notice: Subject to any disclaimer, the term of this patent is extended or adjusted under 35 U.S.C. 154(b) by 473 days.

(21) Appl. No.: 10/439,807

(22) Filed: May 16, 2003

(65) Prior Publication Data

US 2004/0023119 A1 Feb. 5, 2004

(30) Foreign Application Priority Data

May 27, 2002 (JP) .......................... P2002-152720

(51) Int. Cl.
*H01M 4/58* (2006.01)
*H01M 4/82* (2006.01)

(52) U.S. Cl. ................... 429/218.1; 29/623.5; 429/133
(58) Field of Classification Search ..................... None
See application file for complete search history.

(56) References Cited

U.S. PATENT DOCUMENTS 6,183,908 B1 * 2/2001 Miyasaka et al. ........ 429/218.1

FOREIGN PATENT DOCUMENTS

JP 11-73946 * 3/1999

* cited by examiner

*Primary Examiner*—Stephen Kalafut
*Assistant Examiner*—Julian Mercado
(74) *Attorney, Agent, or Firm*—Sonnenschein Nath & Rosenthal LLP

(57) ABSTRACT

The battery comprises a positive electrode which has a positive electrode active material compound layer containing a positive electrode active material formed on a positive electrode current collector; a negative electrode which has at least one negative electrode thin film layer and at least one negative electrode active material compound layer, on a negative electrode current collector, and a non-aqueous electrolyte containing an electrolyte salt. The negative electrode thin film layer contains at least one Group 14 element, and is formed by a thin-film formation technology, and the negative electrode active material compound layer contains a binder and a negative electrode active material, which contains at least any one of Sn, Si, Sn compound, Si compound and carbonaceous material. With this negative electrode, the negative electrode thin film layer containing a high-capacity Group 14 element raises the battery capacity, and the negative electrode active material compound layer provides excellent charge/discharge cycle characteristics while suppressing degradation of the negative electrode even under repetitive charge/discharge.

6 Claims, 1 Drawing Sheet

NON-AQUEOUS ELECTROLYTE BATTERY AND METHOD OF MANUFACTURING THE SAME

CROSS REFERENCES TO RELATED APPLICATIONS

The present invention claims priority to its priority document No. 2002-152720 filed in the Japanese Patent Office on May 27, 2002, the entire contents of which being incorporated by reference herein.

BACKGROUND OF THE INVENTION

1. Field of the Invention

The present invention relates to a non-aqueous electrolyte battery which comprises a positive electrode, a negative electrode and a non-aqueous electrolyte, and has battery characteristics improved to a large degree, and also relates to a method of manufacturing the same.

2. Description of the Related Art

Recent development activities on secondary batteries are directed to reduced-weight and larger energy density intended for use as a power source for electronic appliances such as a laptop personal computer, a mobile phone and a camera-integrated VTR (video tape recorder). One known secondary battery having a large energy density is lithium ion secondary battery which typically has an energy density larger than those of a lead battery, a nickel-cadmium battery, a nickel-hydrogen battery or the like.

The lithium ion secondary battery uses, for a negative electrode active material thereof, a carbonaceous material such as non-graphitizable carbon, graphite or the like in order to obtain a relatively large capacity and excellent cycle characteristics. As for the negative electrode active material for ensuring large capacity, Japanese Patent Application Publication Laid-Open No. Hei 8-315825 discloses that appropriate selection of a starting source material for the carbonaceous material and proper control of production conditions for the carbonaceous material can further increase the capacity.

It is, however, intrinsically difficult for the above-described lithium ion secondary battery to further increase the capacity because critical capacity of the carbonaceous material used for the negative electrode active material is limited as high as 370 mAh/g or around.

One possible solution for this problem relates to a lithium ion secondary battery, in which a special kind of lithium alloy, having still some room for upgrading in capacity, is used as a negative electrode active material in place of a carbonaceous material, where the charge/discharge is based on reversible electrochemical generation/decomposition of the lithium alloy.

As for use of the lithium alloy as the negative electrode active material, use of a Li—Al alloy, a Li—Si alloy and so forth has already been known. In particular, U.S. Pat. No. 4,950,566 describes use of a Li—Si alloy for the negative electrode.

The lithium ion secondary battery using a lithium alloy for the negative electrode, however, suffers from a problem that the lithium alloy considerably expands or shrinks during the charge/discharge cycle, and the repetitive charge/discharge cycles cause repetitive expansion/shrinkage of the lithium alloy, which may pulverize the lithium alloy, may disconnect mutual contact among grains of the negative electrode active material, may degrade conductivity of the negative electrode, and thus may ruin battery characteristics.

One known measure proposed for solving this problem is such that the surface of the negative electrode active material is covered, for example, with a highly-conductive material so as to keep conductivity among grains of the lithium alloy even after the alloy is pulverized due to repetitive charge/discharge. More specifically, methods of covering the surface of the negative electrode active material with a highly conductive material using techniques such as immersing a lithium alloy into an organic solvent dissolved with a highly-conductive material, or based on a mechanochemical reaction such as hybridization, are disclosed for example in Japanese Patent Application Publication Laid-Open Nos. 2000-173669, 2000-173670 and 2001-68096.

It is, however, still difficult for these proposals to fully suppress the degradation of the large-capacity negative electrode active material such as lithium alloy under repetitive charge/discharge cycles, and the negative electrode active materials still cannot fully exhibit their potential for higher capacity at present.

SUMMARY OF THE INVENTION

The present invention is conceived after considering the aforementioned situation, and is to provide a non-aqueous electrolyte battery having a large energy density and being successfully prevented from being degraded in battery characteristics under repetitive charge/discharge, and is to provide also a method of manufacturing the non-aqueous electrolyte battery.

The non-aqueous electrolyte battery according to the present invention comprises a positive electrode having a positive electrode active material compound layer containing a positive electrode active material, on a positive electrode current collector; a negative electrode having at least one negative electrode thin film layer and, beside the negative electrode thin film layer, at least one negative electrode active material compound layer, on a negative electrode current collector, and a non-aqueous electrolyte containing an electrolyte salt. In the non-aqueous electrolyte battery, the negative electrode thin film layer contains at least one Group 14 element, and is formed by a thin-film formation technology, and the negative electrode active material compound layer contains a binder and a negative electrode active material, which contains at least any one of Sn, Si, Sn compound, Si compound and carbonaceous material.

In this non-aqueous electrolyte battery, the negative electrode thin film layer formed by a thin-film formation technology and containing the large-capacity Group 14 element contributes to increase in the battery capacity, and the negative electrode active material compound layer containing a negative electrode active material and the binder contributes to prevention of degradation of the negative electrode due to pulverization of the negative electrode active material possibly caused by repetitive expansion/shrinkage thereof under repetitive charge/discharge.

The method of manufacturing a non-aqueous electrolyte battery according to the present invention is to fabricate a non-aqueous electrolyte containing an electrolyte salt. The method comprises the steps of fabricating a positive electrode which has a positive electrode active material compound layer containing a positive electrode active material formed on a positive electrode current collector; and fabricating a negative electrode having at least one negative electrode thin film layer and, beside the negative electrode thin film layer containing at least one Group 14 element, and being formed by a thin-film formation technology, and at least one negative electrode active material compound layer containing a negative electrode active material, which contains at least any one of Sn, Si, Sn compound, Si compound and carbonaceous material, and a binder, formed on a negative electrode current collector, the negative electrode thin film.

In this method of manufacturing the non-aqueous electrolyte battery, the negative electrode thin film layer formed by a thin-film formation technology and containing the large-capacity Group 14 element contributes to increase in the battery capacity, and the negative electrode active material compound layer containing a negative electrode active material and the binder contributes to prevention of degradation of the negative electrode due to pulverization of the negative electrode active material possibly caused by repetitive expansion-and-shrinkage thereof under repetitive charge/discharge. Thus a non-aqueous electrolyte battery having a large battery capacity and being successfully prevented form being degraded in the battery characteristics due to expansion-and-shrinkage of the negative electrode active material during repetitive charge/discharge can be obtained.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which.

DETAILED DESCRIPTION OF THE PREFERRED EMBODIMENTS

Figure 1:
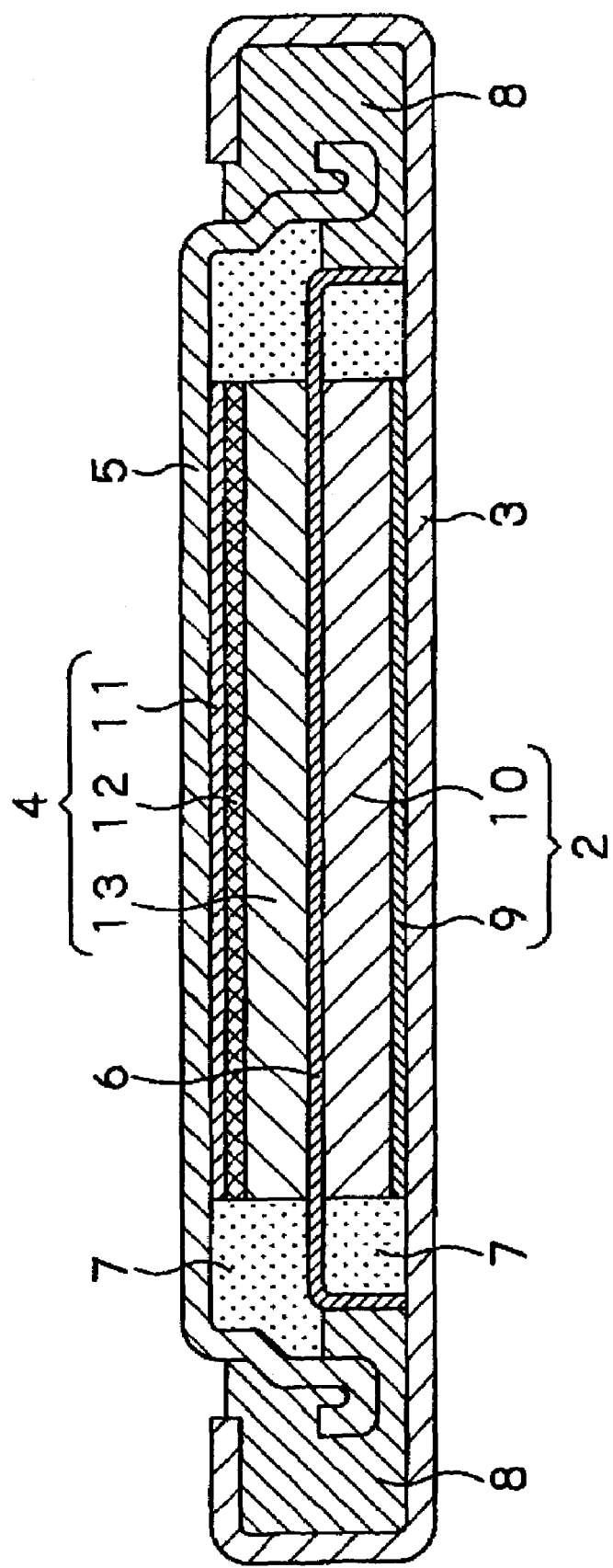
FIG. 1 is a schematic sectional view showing an internal structure of a lithium ion secondary battery according to the present invention.

A non-aqueous electrolyte battery applied with the present invention will be described below. An exemplary constitution of a lithium ion secondary battery (simply referred to as "battery", hereinafter), as a representative of the non-aqueous electrolyte battery, is shown in FIG. 1. A battery 1 comprises a pellet-formed positive electrode 2, a positive electrode can 3 for housing the positive electrode 2, a pellet-formed negative electrode 4, a negative electrode can 5 for housing the negative electrode 4, a separator 6 disposed between the positive electrode 2 and negative electrode 4, an insulating gasket 8 and a non-aqueous electrolyte solution 7.

The positive electrode 2 is configured so that a positive electrode active material compound layer 10, which contains a positive electrode active material, is formed on a positive electrode current collector 9. The positive electrode active material contained in the positive electrode 2 is typically composed of lithium composite oxide typically expressed by $Li_xMO_2$ (where, x falls within a range from 0.5 to 1.1, and M represents any one or a plurality of transition metals), lithium-free metal sulfide or metal oxide such as $TiS_2$, $MoS_2$, $NbSe_2$ and $V_2O_5$, or a certain polymer and the like. Examples of the lithium composite oxide include $LiCoO_2$, $LiNiO_2$, $Li_xNi_yCO_{1-y}O_2$ (where x and y satisfy $0<x<1$ and $0.7<y<1.02$, respectively, although variable depending on charge/discharge conditions of the battery), and spinel-type, lithium-manganese composite oxide typically expressed by $LiMn_2O_4$. For the positive electrode active material of the positive electrode 2, it is also allowable to use any one of, or any mixtures of the aforementioned metal sulfide, metal oxide and lithium composite oxide and the like.

The positive electrode current collector 9 of the positive electrode 2 may be typically composed of a mesh-formed or a foil-formed aluminum. A binder contained in the positive electrode active material compound layer 10 of the positive electrode 2 may be any known resin material generally used for this kind of non-aqueous electrolyte battery. The binder may be specifically exemplified by poly(vinylidene fluoride). A conductive material contained in the positive electrode active material compound layer 10 of the positive electrode 2 may be any known material generally used for this kind of non-aqueous electrolyte battery. Specific examples of the conductive material include carbon black and graphite.

The positive electrode can 3 is a container having a form of shallow dish, which is a so-called Petri dish, for housing the positive electrode 2, and is made of a conductive metal. The positive electrode can 3 serves as an external positive electrode of the battery 1. More specifically, the positive electrode can 3 is composed of a stack-structured metal container in which aluminum, stainless steel and nickel layers are stacked in this order in the thickness-wise direction thereof when viewed from the positive electrode 2 side assuming that the positive electrode 2 is housed therein.

The negative electrode 4 is configured so that a negative electrode thin film layer 12 containing at least one Group 14 element and serves as a negative electrode active material layer allowing lithium to insert/extract thereto and therefrom in charge/discharge of the battery 1, and a negative electrode active material compound layer 13 containing at least any one of Sn, Si, Sn compound, Si compound and carbonaceous material are stacked on a negative electrode current collector 11.

Available positive electrode active materials possibly contained in the negative electrode thin film layer 12 of the negative electrode 4 may include Group 14 elements such as Si, Sn and Ge, and compound of these Group 14 elements, where any one of, or two or more of them in a mixed form can be used. The compounds of the Group 14 elements include those obtained by reacting Si, Sn, Ge, etc. with transition metals such as Co, Ni, Fe, etc., or with Group 2 elements, or with Groups 13 to 17 elements, and those classified as intermetallic compounds, where any one of, or two or more of them in a mixed form can be used. Because electric capacity of the Group 14 elements contained as the negative electrode active material is far more larger than that, for example, of carbonaceous materials, the negative electrode thin film layer 12 of the negative electrode 4 functions so as to raise battery capacity of the battery 1.

The negative electrode thin film layer 12 is formed typically by thin-film formation technology. More specifically, the layer 12 is formed on the negative electrode current collector 11 by vacuum evaporation or sputtering. Any negative electrode thin film layer 12 composed of an alloy containing Sn or the like can be formed by electroplating or electroless plating.

Because the negative electrode thin film layer 12 is thus obtained by forming the negative electrode active material containing at least one Group 14 element having a relatively large capacity by thin-film formation technology such as vacuum evaporation, sputtering or plating on the negative electrode current collector 11 as described in the above, it is made possible to pack the negative electrode active material containing a large-capacity Group 14 element more densely, and this functions so as to further raise battery capacity of the battery 1.

The negative electrode active material compound layer 13 of the negative electrode 4 may contain, as the negative electrode active material, any one of, or mix of two or more of Sn, Si, Sn compound, Si compound and carbonaceous material. The Sn compound may include AsSn, AuSn, $CaSn_3$, $CeSn_3$, $CoCu_2Sn$, $Co_2MnSn$, $CoNiSn$, $CoSn_2$, $Co_3Sn_2$, $CrCu_2Sn$, $Cu_2FeSn$, $CuMgSn$, $Cu_2MnSn$, $Cu_4MnSn$, $Cu_2NiSn$, $CuSn$, $Cu_3Sn$, $Cu_6Sn_5$, $FeSn_2$, $IrSn$, $IrSn_3$, $MgNi_2Sn$, $Mg_2Sn$, $MnNi_2Sn$, $MnSn_2$, $Mn_2Sn$, $Mo_3Sn$, $Nb_3Sn$, $NdSn_3$, $NiSn$, $Ni_3Sn_2$, $Pd_3Sn$, $Pd_3Sn_2$, $PrSn_3$, $PtSn$, $PtSn_2$, $Pt_3Sn$, $PuSn_3$, $RhSn$, $Rh_3Sn_2$, $RuSn_2$, $SbSn$, $SnTi_2$, $Sn_3U$ and $SnV_3$. The Si compound may include $As_3Li_5Si$, $BeSiZr$, $CoSi_2$, $\beta\text{-}Cr_3Si$, $Cu_3Mg_2Si$, $Fe_3Si$, $Li_5P_3Si$, $Mg_2Si$, $MoSi_2$, $Nb_3Si$, $NiSi_2$, $\theta\text{-}Ni_2Si$, $\beta\text{-}Ni_3Si$, $ReSi_2$, $\alpha\text{-}RuSi$, $SiTa_2$, $Si_2Th$, $Si_2U$, $\beta\text{-}Si_2U$, $Si_3U$, $SiV_3$, $Si_2W$ and $SiZr_2$.

The carbonaceous material contained in the negative electrode active material composing the negative electrode active material compound layer 13 may be any of those capable of allowing lithium ion to insert therein or extract therefrom, and examples thereof include carbon blacks such as acetylene black, Ketjen black, thermal black and furnace black; non-graphitizable carbon; graphites such as artificial graphite or naturally-occurred graphite; pyrolytic carbons; cokes such as pitch coke, needle coke and petroleum coke; vitreous carbons (glass-like carbons); carbonized organic polymer compounds obtained by sintering phenol resin, furan resin or the like at appropriate temperatures; activated carbon; and fibrous carbon. These carbonaceous materials can also function as a conductive material for improving conductivity of the negative electrode active material compound layer 13 when they are mixed with any of the aforementioned Sn, Si, Sn compound, Si compound and the like so as to compose the negative electrode active material compound layer 13.

The negative electrode active material compound layer 13 of the negative electrode 4 is formed by adding a binder to the aforementioned negative electrode active material, where the binder may be any publicly-known resin materials generally used for this kind of non-aqueous electrolyte battery. Specific examples of the binder may include poly (vinilydene fluoride) and styrene-butadiene rubber.

In the negative electrode active material compound layer 13, grains of the negative electrode active material are immobilized by a binder so as to mutually contact with each other, and so as to produce proper gaps in the layer. This successfully acts so as to prevent the negative electrode active material from being pulverized due to repetitive expansion-and-shrinkage during repetitive charge/discharge of the battery 1.

That is, in the negative electrode active material compound layer 13, the gaps in the layer can suppress mutual interference of the grains of the expanded negative electrode active material during charging of the battery 1, and can prevent the negative electrode active material from cracking and pulverizing due to stress which otherwise possibly be exerted by mutual interference of the grains of the negative electrode active material, and this successfully suppresses lowering of conductivity of the negative electrode 4. In particular for a case where the carbonaceous material is contained as the negative electrode active material in the negative electrode active material compound layer 13, conductivity of the negative electrode 4 is increased and the battery characteristics of the battery 1 are thus improved, because the carbonaceous material shows only a smaller expansion-and-shrink during the charge/discharge as compared with that of the aforementioned Sn, Si, Sn compound and Si compound, and can also act as a conductive material in the layer.

Thus-configured negative electrode 4 increases the battery capacity by virtue of the large-capacity Group 14 element contained in the negative electrode thin film layer 12, and suppresses degradation of the battery characteristics under repetitive charge/discharge by preventing the negative electrode active material compound layer 13 from being pulverized due to repetitive charge/discharge.

Although the above-described negative electrode 4 shown in FIG. 1 is configured so that the negative electrode thin film layer 12 and the negative electrode active material compound layer 13 are sequentially stacked on the negative electrode current collector 11, the constitution is by no means limited thereto, and for example, even a sequential stacking of the negative electrode active material compound layer 13 and negative electrode thin film layer 12 in this order on the negative electrode current collector 11 can give operations and effects similar to those shown by the above-described negative electrode thin film layer 12 and negative electrode active material compound layer 13. Although the above-described negative electrode 4 shown in FIG. 1 is configured so that the negative electrode thin film layer 12 and the negative electrode active material compound layer 13 are disposed one by one, the constitution is by no means limited thereto, and for example, the negative electrode thin film layer 12 and negative electrode active material compound layer 13 respectively disposed in a number of two or more can give operations and effects similar to those shown by the above-described negative electrode thin film layer 12 and negative electrode active material compound layer 13. Moreover, although the above-described negative electrode 4 shown in FIG. 1 is configured so that both of the negative electrode thin film layer 12 and the negative electrode active material compound layer 13 are disposed on the negative electrode current collector 11, the constitution is by no means limited thereto, and for example, even a constitution in which only the negative electrode thin film layer 12 is formed on the negative electrode current collector 11 can give a battery capacity larger than that of the conventional non-aqueous electrolyte battery having a negative electrode in which only a negative electrode active material compound layer using a carbonaceous material as a negative electrode active material is formed as a negative electrode active material layer on the negative electrode side.

In the negative electrode 4, it is also allowable that the negative electrode thin film layer 12 contains any one of, or two or more of the aforementioned Sn, Si, Sn compound, Si compound and carbonaceous material. In particular, for a case where the carbonaceous material is contained as the negative electrode active material in the negative electrode thin film layer 12, the battery characteristics of the battery 1 is thus improved, because the carbonaceous material shows only a smaller expansion-and-shrink during the charge/discharge as compared with that of the aforementioned Sn, Si, Sn compound and Si compound, and can also act as a conductive material in the layer.

In the negative electrode 4, the negative electrode thin film layer 12 is adjusted so as to have a thickness within a range from 1 μm to 30 μm. Too thin thickness of the negative electrode thin film layer 12 less than 1 μm makes it difficult to obtain operations and effects of the negative electrode thin film layer 12, and to achieve a considerable increase in the battery capacity. On the contrary, too large thickness of the negative electrode thin film layer 12 exceeding 30 μm causes cracks of the dense negative electrode thin film layer 12 due to expansion-and-shrinkage of the negative electrode active material during repetitive charge/discharge of the battery 1, and this degrades the negative electrode 4 and ruins the battery characteristics.

Thus the battery 1 can achieve a large battery capacity and excellent battery characteristics without causing deterioration of the negative electrode 4 even under repetitive charge/discharge when the thickness of the negative electrode thin film layer 12 of the negative electrode 4 is selected within a range from 1 μm to 30 μm.

The negative electrode can 5 is a Petri-dish-formed container for housing the negative electrode 4 and is composed of a conductive metal, and serves as an external negative electrode of the battery 1. In specific, a metal container composed of stainless steel, iron whose surface is nickel-plated and the like is used for the negative electrode can 5.

The separator 6 is a member for isolating the positive electrode 2 and the negative electrode 4 so as to prevent them from being in contact and being short-circuited, but allowing lithium ions in the non-aqueous electrolyte solution 7 to pass therethrough. The separator 6 comprises a fine porous film having a great number of fine pores. The fine porous film in the context herein means a resin film having a large number of fine pores having an average pore size of approx. 5 μm or smaller. Any materials having been used for the conventional batteries are available for the separator 6. Among others, fine porous films such as being made of polypropylene or polyolefins are preferably used since they are excellent in short-circuiting preventive effect, and capable of improving safety of the battery through shut-down effect.

The separator 6 is adjusted so as to have a thickness within a range from 5 μm to 50 μm, and a porosity, which indicates a ratio of void volume to the total volume, within a range from 20% to 60%. The separator 6 satisfying these conditions successfully results in the battery 1 excellent in production yield, output characteristics, cycle characteristics and safety.

The insulating gasket 8 is built in the negative electrode can 5 so as to be integrated therewith, and is typically composed of an organic resin such as polypropylene. The insulating gasket 8 insulates the positive electrode can 3 which serves as the external positive electrode and the negative electrode can 5 which serves as the external negative electrode, and also functions so as to prevent the non-aqueous electrolyte solution 7 filled in the positive electrode can 3 and negative electrode can from leaking.

The non-aqueous electrolyte solution 7 may typically be a solution prepared by dissolving an electrolyte salt in a non-aqueous solvent. Examples of the non-aqueous solvent includes cyclic carbonate ester compounds; and cyclic carbonate ester compounds or chain-formed carbonate ester compounds of which hydrogen atom is substituted by a halogen group or a halogenated acrylic group. More specifically, the non-aqueous solvent may be propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetic acid ester, lactic acid ester and propionic acid ester, where all of which can be used independently or in combination.

The electrolyte salts include $LiPF_6$, $LiClO_4$, $LiAsF_6$, $LiBF_4$, $LiB(C_6H_5)_4$, $LiCF_3SO_3$, $LiCH_3SO_3$, $LiN(CF_3SO_2)2$, $LiSbF_6LiCl$ and $LiBr$, where all of which can be used independently or in combination.

Thus-configured battery 1 can be manufactured as follows. First, the positive electrode 2 is fabricated. In the fabrication process of the positive electrode 2, a positive electrode active material compound coating liquid containing a positive electrode active material, a conductive material and a binder is prepared first, and the positive electrode active material compound coating liquid is then uniformly coated on the positive electrode current collector 9 which comprises a metal foil such as an aluminum foil or the like, dried, and compressed to thereby form the positive electrode active material compound layer 10. The positive electrode current collector 9 and the positive electrode active material compound layer 10 are then punched en bloc in a predetermined shape to thereby obtain the positive electrode 2.

Next the negative electrode 4 is fabricated. First, the negative electrode thin film layer 12 is formed on the negative electrode current collector 11. In the fabrication, the surface of the negative electrode current collector 11 is degreased using a cleaning liquid such as alcohol, then activated using an aqueous phosphoric acid solution, diluted aqueous sulfuric acid solution or the like, and thus-treated negative electrode current collector 11 is then immersed in a plating bath containing at least the Group 14 element. In the plating, use of the plating bath containing at least any one of Sn, Si, Sn compound, Si compound and carbonaceous material in a powder form result in a composite plated film containing any one of these powders therein. The thickness of the negative electrode thin film layer 12 is controllable by adjusting a duration of time during which the negative electrode current collector 11 is immersed in the plating bath. For a case where Si or Ge, for example, is used as the Group 14 element, the negative electrode thin film layer 12 can be formed by the thin-film formation technology such as vacuum evaporation or sputtering on a surface of the current collector 11 preliminarily subjected to the aforementioned degreasing and activation treatments. In the film formation, carrying out of the vacuum evaporation or sputtering while spraying at least any one of Sn, Si, Sn compound, Si compound and carbonaceous material in a powdered form towards the surface of the negative electrode current collector 11 can yield the negative electrode thin film layer 12 containing any of these powders therein.

Next, the negative electrode active material compound layer 13 is formed. The negative electrode active material compound layer 13 can be formed by first uniformly coating a negative electrode active material compound coating liquid on the negative electrode current collector 11 having already formed thereon the negative electrode thin film layer 12, where the coating liquid containing a negative electrode active material comprising at least any one of Sn, Si, Sn compound, Si compound and carbonaceous material dispersed together with the binder in the non-aqueous solvent or the like, and by drying the coated film and compressing to thereby form it on the negative electrode current collector 11. The negative electrode thin film layer 12 and the negative electrode active material compound layer 13 sequentially stacked on the negative electrode current collector 11 are then punched together with the negative electrode current collector 11 in a predetermined shape. This process is successful in fabricating the negative electrode 4 having the negative electrode thin film layer 12 and the negative electrode active material compound layer 13 which serve as negative electrode active material layers.

The non-aqueous electrolyte solution 7 can be prepared by dissolving an electrolyte salt in a non-aqueous solvent. Next, the positive electrode 2 is housed in the positive electrode can 3, the negative electrode 4 is housed in the negative electrode can 5, and the separator 6 typically composed of a porous film of polypropylene is disposed between the positive electrode 2 and the negative electrode 4. Thus the battery 1 has an internal structure in which the positive electrode 2, the separator 6 and the negative electrode 4 are sequentially stacked.

The non-aqueous electrolyte solution 7 is then poured into the positive electrode can 3 and the negative electrode can 5, and these cans are caulked while placing the insulating gasket 8 in between, to thereby fabricate the battery 1 in a coin shape.

Thus-fabricated battery 1 successfully raises the battery capacity by virtue of a high-capacity Group 14 element contained in the negative electrode thin film layer 12 of the negative electrode 4. The battery 1 is also successful in suppressing degradation in battery characteristics under repetitive charge/discharge, because the negative electrode active material compound layer 13 of the negative electrode 4 can prevent the negative electrode active material from being pulverized, and thus can prevent conductivity of the negative electrode 4 from being lowered by repetitive charge/discharge.

The battery 1 therefore successfully achieves a large battery capacity, and an excellent cycle characteristics while suppressing degradation in the battery characteristics under repetitive charge/discharge.

While the aforementioned embodiment dealt with the battery 1 using the non-aqueous electrolyte solution 7, the present invention is by no means limited to the above, and it is also allowable to use a solid electrolyte such as inorganic, polymer and gel-like ones, in place of the non-aqueous electrolyte solution 7.

Examples of the inorganic solid electrolyte include lithium nitride and lithium iodide. The polymer solid electrolyte typically comprises at least one of the above-described electrolyte salt and a polymer compound which can exhibit ion conductivity after being added with the electrolyte salt. Examples of the polymer compound available for the polymer solid electrolyte include ether polymers such as poly(ethylene oxide) and crosslinked products thereof; ester polymers such as poly(methacrylate); and acrylate polymer, where all of which can be used independently or in combination. The gel electrolyte comprises at least one of the above-described, non-aqueous electrolyte solution 7 and a matrix polymer capable of forming a gel by absorbing the non-aqueous electrolyte solution 7. Examples of the matrix polymer available for the gel electrolyte include fluorine-containing polymers such as poly(vinylidene fluoride) and poly(vinylidene fluoride-co-hexafluoro propylene); ether polymers such as poly(ethylene oxide) and crosslinked products thereof; and poly(acrylonitrile); where all of which can be used independently or in combination. In particular for the matrix polymer, it is preferable to use a fluorine-containing polymer which generally has an excellent redox stability.

While the aforementioned embodiment dealt with a coin-shaped battery, the present invention is by no means limited to the embodiment, and allows any battery of which exterior member is composed of a metal container in a form of a cylinder, a square box, a button or the like; or any battery of which thin exterior member is composed of a laminated film, where any of these members can have a variety of forms and sizes. In the non-aqueous electrolyte battery, lithium resides in the battery is not limited to that being originated from the negative electrode or positive electrode which preliminarily contains lithium, but can be inserted during the fabrication process of the battery by a electrochemical mechanism.

Next paragraphs will describe samples of lithium ion secondary battery actually manufactured as the non-aqueous electrolyte battery applied with the present invention.

<Sample 1>

In Sample 1, a negative electrode was fabricated first. In the fabrication of the negative electrode, a copper foil of 15 μm thick was used as the negative electrode current collector, and the negative electrode current collector was then subjected to activation treatment by immersing it in an aqueous phosphoric acid solution and successively in an aqueous dilute sulfuric acid solution, and then subjected to electroplating using an Sn plating bath containing a carbonaceous material, to thereby form the negative electrode thin film layer composed of a composite plated film containing Sn and the carbonaceous material as the negative electrode active materials. The negative electrode thin film layer herein was controlled to have a thickness of 30 μm by adjusting a duration of time of the electroplating. Next, a negative electrode active material compound coating liquid was prepared by homogeneously dispersing 89 g of graphite as the negative electrode active material, 1 g of acetylene black as the conductive material and 10 g of poly(vinylidene fluoride) (PVdF) as the binder in N-methyl-2-pyroliodone (NMP). The negative electrode active material compound coating liquid is then uniformly coated on the negative electrode thin film layer already formed on the negative electrode current collector, then dried, and compressed using a roll press machine so as to form the negative electrode active material compound layer. The negative electrode thin film layer and the negative electrode active material compound layer sequentially stacked on the negative electrode current collector were then punched together with the negative electrode current collector. A pellet-formed negative electrode having a diameter of 15.2 mm, and having the negative electrode thin film layer and the negative electrode active material compound layer as the negative electrode active material layers, was thus fabricated.

Next, the positive electrode was fabricated using lithium metal so as to confirm performance of the negative electrode. The positive electrode was obtained by punching a lithium metal sheet in a pellet form having a diameter of 15.5 mm.

Next the non-aqueous electrolyte solution was prepared by dissolving $LiPF_6$ in a solvent obtained by mixing isovolume ethylene carbonate and propylene carbonate so as to adjust the concentration thereof to 1 mol/L.

Thus-fabricated negative electrode was housed in the negative electrode can, the positive electrode was housed in the positive electrode can having a stacked structure of aluminum, stainless steel and nickel layers as viewed from the inner side, and a separator composed of a fine-porous polypropylene film of 25 μm thick was then disposed in a stacked form between the negative electrode and positive electrode.

Next, the non-aqueous electrolyte was then poured into the negative electrode can and positive electrode can, and the both cans were then caulked while placing the insulating gasket composed of polypropylene in between, to thereby fabricate a coin-formed lithium battery having a diameter of 20 mm and a thickness of 1.6 mm. It is to be noted that the lithium ion secondary battery is simply referred to as "battery" hereinafter as a matter of convenience in the description below.

<Sample 2>

In sample 2, a negative electrode having the negative electrode thin film layer and the negative electrode active material compound layer sequentially stacked on the negative electrode current collector was fabricated similarly to Sample 1, except that the negative electrode thin film layer was formed on the negative electrode current collector by depositing Ge using an RF sputtering apparatus in the process of fabricating the negative electrode. Except for using this negative electrode, the battery was fabricated similarly to Sample 1.

<Sample 3>

In sample 3, a negative electrode having the negative electrode thin film layer and the negative electrode active material compound layer sequentially stacked on the negative electrode current collector was fabricated similarly to Sample 1, except that the negative electrode thin film layer was formed on the negative electrode current collector by depositing Si using an RF sputtering apparatus in the process of fabricating the negative electrode. Except for using this negative electrode, the battery was fabricated similarly to Sample 1.

<Sample 4>

In sample 4, a negative electrode having only a negative electrode active material compound layer formed on the negative electrode current collector was fabricated similarly to Sample 1, except that the negative electrode thin film layer was not formed in the process of fabricating the negative electrode. Except for using this negative electrode, the battery was fabricated similarly to Sample 1.

Thus-fabricated batteries in Samples 1 to 4 were subjected to measurements of initial discharge capacity and relative discharge capacity after the 100th cycle.

Table 1 shows evaluated results of the initial discharge capacity and relative discharge capacity after the 100th cycle of these Samples.

TABLE 1

| | Negative electrode thin film layer | Negative electrode active material compound layer | Initial discharge capacity (mAh/g) | Relative discharge capacity after 100th cycle (%) |
|---|---|---|---|---|
| Sample 1 | Sn-containing composite plated film | Graphite | 490 | 88 |
| Sample 2 | Ge | Graphite | 440 | 89 |
| Sample 3 | Si | Graphite | 505 | 85 |
| Sample 4 | None | Graphite | 330 | 90 |

The initial discharge capacity of the individual Samples was evaluated as follows. The batteries of the individual samples were charged under a constant current of 2 mA and a constant voltage of maximum 4.2 V in an atmosphere of 23° C., and were then discharged under a constant current of 2 mA down to 3 V in an atmosphere of 23° C. Values shown in Table 1 were obtained by converting thus-measured values of the initial discharge capacity into discharge capacity per 1 g of the negative electrode active material contained in the individual Samples. The relative discharge capacity after the 100th cycle was evaluated by repeating the charge/discharge 100 times under conditions similar to those for the measurement of the initial discharge capacity, so as to measure discharge capacities for the first time and for the 100th time. The relative discharge capacity after the 100th cycle was defined as a ratio of the discharge capacity observed after the 100th cycle to the initial discharge capacity.

It is known from the results summarized in Table 1 that Samples 1 to 3 having the negative electrode in which the negative electrode thin film layer and the negative electrode active material compound layer are sequentially stacked as the negative electrode active material layers show larger values of the initial discharge capacity as compared with that of Sample 4 having the negative electrode in which the negative electrode active material layer is composed of the negative electrode active material compound layer only.

It was considered as being difficult for Sample 4 to increase the battery capacity even though the battery characteristics thereof were not ruined under repetitive charge/discharge, because it has only the negative electrode active material compound layer formed, as the negative electrode active material layer, on the negative electrode current collector, but has no negative electrode thin film layer capable of increasing the battery capacity.

On the contrary in Samples 1 to 3, the negative electrode thin film layer and the negative electrode active material compound layer were sequentially stacked as the negative electrode active material layers on the negative electrode current collector, and of these, the negative electrode thin film layer containing a Group 14 element as the negative electrode active material contributed to a dramatic increase in the battery capacity, and the negative electrode active material compound layer prevented the negative electrode active material from being pulverized under repetitive charge/discharge to thereby prevent conductivity of the negative electrode from being lowered, and to consequently suppress degradation of the battery characteristics even under repetitive charge/discharge. Therefore in Samples 1 to 3, the initial discharge capacity could dramatically be increased, and lowering of the relative discharge capacity after the 100th cycle could successfully be suppressed.

As judged from the above, it is known that forming both of the negative electrode thin film layer and the negative electrode active material compound layer for the negative electrode is very effective for the purpose of manufacturing the battery having a large initial discharge capacity, and a relative discharge capacity after the 100th cycle which is well prevented from being degraded.

Next, in order to confirm influences of the thickness of the negative electrode thin film layer, Samples 5 to 10 were fabricated, where constitution of the negative electrode was altered so that only the negative electrode thin film layer was formed on the negative electrode current collector.

<Sample 5>

In sample 5, the negative electrode only having the negative electrode thin film layer of 30 μm thick formed on the negative electrode current collector was fabricated similarly to Sample 1, except that the negative electrode active material compound layer was not formed in the process of fabricating the negative electrode. Except for using this negative electrode, the battery was fabricated similarly to Sample 1.

<Sample 6>

In sample 6, the battery was fabricated similarly to Sample 5 except that the thickness of the negative electrode thin film layer was adjusted to 1 μm.

<Sample 7>

In sample 7, the battery was fabricated similarly to Sample 5 except that the thickness of the negative electrode thin film layer was adjusted to 10 μm.

<Sample 8>

In sample 8, the battery was fabricated similarly to Sample 5 except that the thickness of the negative electrode thin film layer was adjusted to 20 µm.

<Sample 9>

In sample 9, the battery was fabricated similarly to Sample 5 except that the thickness of the negative electrode thin film layer was adjusted to 0.5 µm.

<Sample 10>

In sample 10, the battery was fabricated similarly to Sample 5 except that the thickness of the negative electrode thin film layer was adjusted to 40 µm.

Thus-fabricated batteries in Samples 5 to 10 were subjected to measurements of initial discharge capacity and relative discharge capacity after the 100th cycle.

Table 2 shows evaluated results of the initial discharge capacity and relative discharge capacity after the 100th cycle of these Samples.

TABLE 2

|  | Negative electrode thin film layer | Thickness of negative electrode thin film layer (µm) | Initial discharge capacity (mAh/g) | Relative discharge capacity after 100th cycle (%) |
|---|---|---|---|---|
| Sample 5 | Sn-containing composite plated film | 30 | 840 | 89 |
| Sample 6 | Sn-containing composite plated film | 1 | 850 | 92 |
| Sample 7 | Sn-containing composite plated film | 10 | 845 | 91 |
| Sample 8 | Sn-containing composite plating | 20 | 835 | 90 |
| Sample 9 | Sn-containing composite plated film | 0.5 | 810 | 88 |
| Sample 10 | Sn-containing composite plated film | 40 | 800 | 50 |

The individual samples were subjected to measurement of the initial discharge capacity and relative discharge capacity after 100th cycle similarly to Samples 1 to 4 in the above.

It is known from the results summarized in Table 2 that Samples 5 to 8 in which the negative electrode thin film layer is adjusted so as to have a thickness of within a range from 1 µm to 30 µm show larger values of the initial discharge capacity and relative discharge capacity after the 100th cycle as compared with that of Sample 9 having the negative electrode thin film layer formed in a thickness only as small as 0.5 µm.

It is found to be difficult for Sample 9 to increase the battery capacity, because the negative electrode thin film layer containing Sn capable of increasing the battery capacity is thin and consequently contains only a too small amount of negative electrode active material.

It is also known from the results summarized in Table 2 that Samples 5 to 8 in which the negative electrode thin film layer is adjusted so as to have a thickness of within a range from 1 µm to 30 µm show larger values of the initial discharge capacity and relative discharge capacity after the 100th cycle as compared with that of Sample 10 having the negative electrode thin film layer formed in a thickness as thick as 40 µm.

In Sample 10, the dense negative electrode thin film layer formed by the thin-film formation technology has an excessive thickness, and this is causative of generating cracks in the negative electrode thin film layer due to expansion-and-shrinkage of Sn under repetitive charge/discharge, to thereby ruin the battery characteristics. In particular in Sample 10, the cracks may grow under the repetitive charge/discharge and may even result in peeling-off of the negative electrode thin film layer, and this considerably ruins the relative discharge capacity after the 100th cycle.

On the contrary in Samples 5 to 8, the battery capacity can be raised and excellent battery characteristics can be obtained without causing cracks in the negative electrode thin film layer even under repetitive charge/discharge, because the negative electrode thin film layer containing Sn capable of increasing the battery capacity is appropriately adjusted so as to have a thickness within a range from 1 µm to 30 µm. Therefore in Samples 5 to 8, the initial discharge capacity can be increased, and lowering of the relative discharge capacity after the 100th cycle can successfully be suppressed.

As judged from the above, it is known that adjusting the thickness of the negative electrode thin film layer within a range from 1 µm to 30 µm is very effective for the purpose of manufacturing the battery having a large initial discharge capacity, and a relative discharge capacity after the 100th cycle which is well prevented from being degraded.

What is claimed is:

1. A non-aqueous electrolyte battery comprising:
    a positive electrode having a positive electrode active material compound layer containing a positive electrode active material, on a positive electrode current collector;
    a negative electrode having a negative electrode thin film layer formed directly on and in contact with a negative electrode current collector, and, a negative electrode active material compound layer formed on said negative electrode thin film layer, the negative electrode thin film layer being disposed between the negative electrode current collector and the negative electrode active material compound layer,
    a separator disposed between and directly in contact with the positive electrode and the negative electrode active material compound layer, wherein:
        said negative electrode thin film layer contains at least one Group 14 element, and is formed by a thin-film formation technology, and
        said negative electrode active material compound layer contains a binder and a negative electrode active material, which contains at least any one of Sn, Si, Sn compound, Si compound and carbonaceous material; and
    a non-aqueous electrolyte containing an electrolyte salt.

2. The non-aqueous electrolyte battery as claimed in claim 1, wherein said negative electrode thin film layer contains at least any one of Sn, Si, Sn compound, Si compound and carbonaceous material.

3. The non-aqueous electrolyte batter as claimed in claim 1, wherein said negative electrode thin film layer has a thickness within a range from 1 µm to 30 µm.

4. A method of manufacturing a non-aqueous electrolyte battery having a non-aqueous electrolyte containing an electrolyte salt, comprising the steps of:

fabricating a positive electrode which has a positive electrode active material compound layer containing a positive electrode active material formed on a positive electrode current collector; and fabricating a negative electrode having a negative electrode thin film layer in contact with a negative electrode current collector, and a negative electrode active material compound layer formed on said negative electrode thin film layer, the negative electrode thin film layer being disposed between the negative electrode current collector and the negative electrode active material compound layer, a separator disposed between and directly in contact with the positive electrode and the negative electrode active material compound layer, wherein:

said negative electrode thin film layer contains at least one Group 14 element, and is formed by a thin-film formation technology, and said negative electrode active material compound layer contains a binder and a negative electrode active material, which contains at least any one of Sn, Si, Sn compound, Si compound and carbonaceous material.

5. The method of manufacturing a non-aqueous electrolyte battery as claimed in claim 4, wherein in the fabrication of said negative electrode, at least any one of Sn, Si, Sn compound, Si compound and carbonaceous material is included in said negative electrode thin film layer.

6. The method of manufacturing a non-aqueous electrolyte battery as claimed in claim 4, wherein in the fabrication of said negative electrode, said negative electrode thin film layer is formed so as to have a thickness within a range from 1 μm to 30 μm.

* * * * *